(12) United States Patent
Liu et al.

(10) Patent No.: US 9,182,550 B1
(45) Date of Patent: Nov. 10, 2015

(54) DISPERSIONLESS OPTICAL TAP FILTER IN BI-DIRECTIONAL MULTIMODE FIBER OPTIC LINK

(71) Applicant: Alliance Fiber Optic Products, Inc., Sunnyvale, CA (US)

(72) Inventors: Fenfei Liu, Fremont, CA (US); Bruce Peng, Fremont, CA (US); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 14/698,662

(22) Filed: Apr. 28, 2015

Related U.S. Application Data

(63) Continuation-in-part of application No. 13/913,480, filed on Jun. 9, 2013.

(60) Provisional application No. 61/689,623, filed on Jun. 11, 2012.

(51) Int. Cl.
| | |
|---|---|
| G02B 6/02 | (2006.01) |
| G02B 6/28 | (2006.01) |
| H04J 14/02 | (2006.01) |
| F01L 1/04 | (2006.01) |
| F01L 13/00 | (2006.01) |
| G02B 6/293 | (2006.01) |
| G02B 6/35 | (2006.01) |
| G02B 6/32 | (2006.01) |
| G02B 6/34 | (2006.01) |
| G02B 6/26 | (2006.01) |

(52) U.S. Cl.
CPC ............ *G02B 6/29385* (2013.01); *G02B 6/268* (2013.01); *G02B 6/2817* (2013.01); *G02B 6/2848* (2013.01); *G02B 6/32* (2013.01); *G02B 6/34* (2013.01); *G02B 6/3546* (2013.01); *G02B 6/3548* (2013.01); *G02B 6/3594* (2013.01)

(58) Field of Classification Search
CPC .......................... G02B 6/2938; G02B 6/20395
USPC ..................................... 385/24, 449, 549, 625
See application file for complete search history.

(56) References Cited

U.S. PATENT DOCUMENTS

| | | | | |
|---|---|---|---|---|
| 6,219,470 B1* | 4/2001 | Tu | ......................... | G02B 6/4204 385/14 |
| 6,789,900 B2* | 9/2004 | Van de Velde | .......... | A61F 9/008 351/221 |
| 8,942,267 B2* | 1/2015 | Ma | ......................... | G02B 5/288 372/101 |
| 2002/0106149 A1* | 8/2002 | Tehrani | ...................... | G01J 3/26 385/27 |
| 2007/0153862 A1* | 7/2007 | Shchegrov | ........... | G02B 27/102 372/50.124 |

* cited by examiner

*Primary Examiner* — Akm Enayet Ullah
(74) *Attorney, Agent, or Firm* — Joe Zheng

(57) ABSTRACT

Techniques for monitoring optical power, dispersion and mode distribution in high speed multimode fiber are described. According to one aspect of the present invention, a multimode optical tap filter is described. In one aspect of the present invention, an optical tap filter is a dispersionless optical tap filter in bi-directional multimode fiber optic link. The optical tap filter includes at least two parts optically engaged with a broadband thin film filter and taps out a monitoring signal from a communication signal according to a ratio set by the broadband thin film filter.

15 Claims, 11 Drawing Sheets

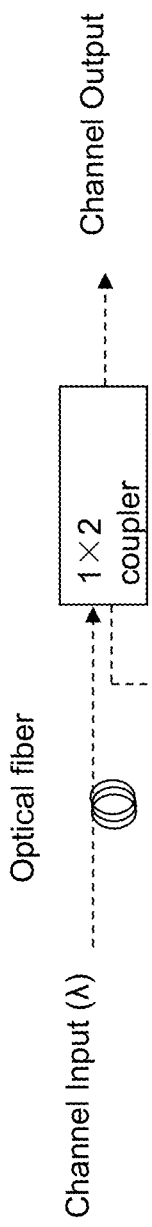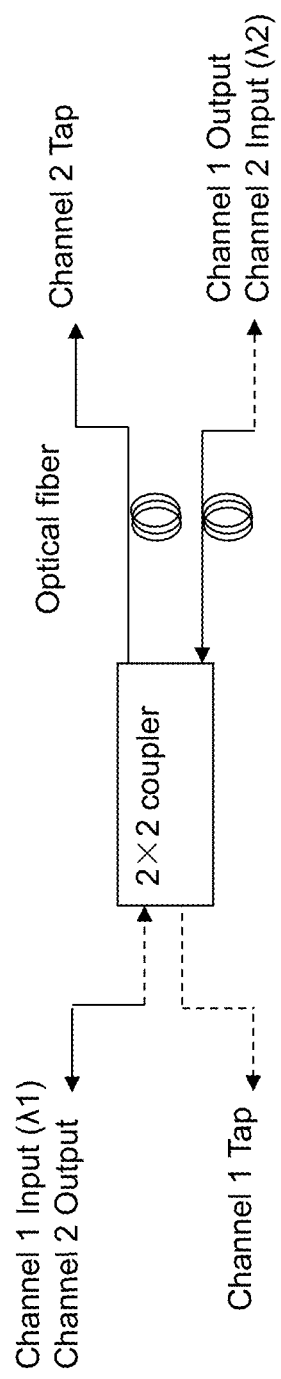

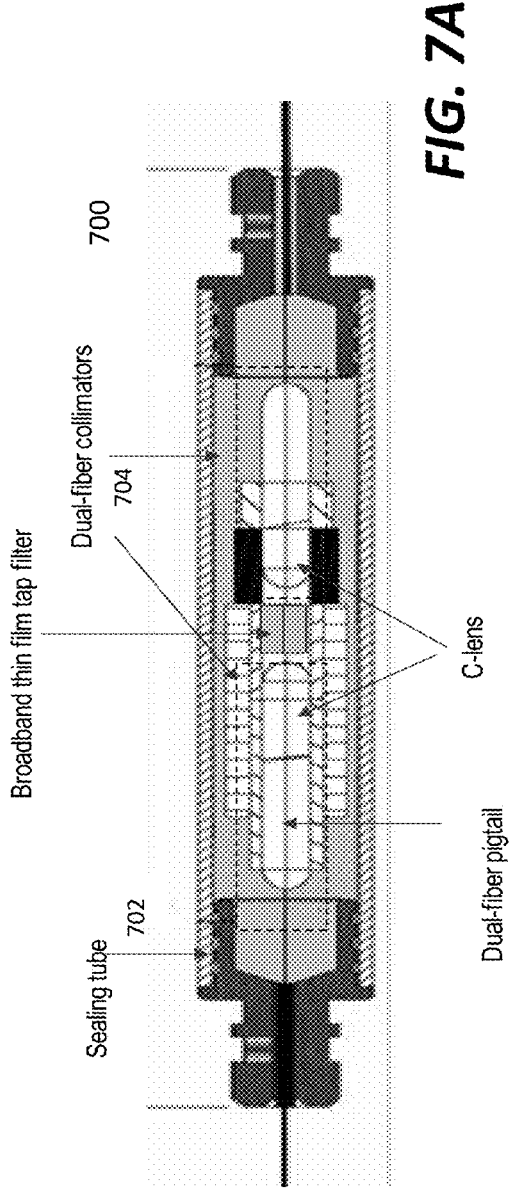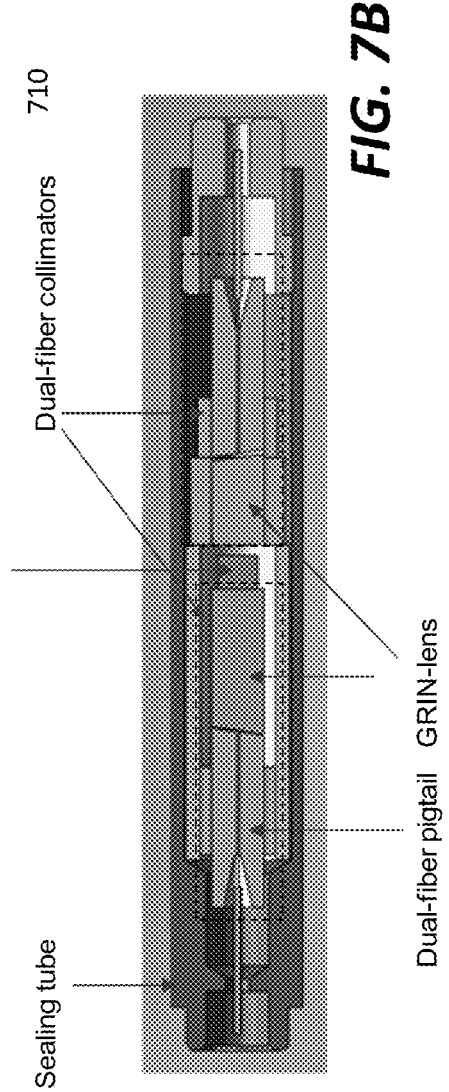
FIG. 7A
FIG. 7B

DISPERSIONLESS OPTICAL TAP FILTER IN BI-DIRECTIONAL MULTIMODE FIBER OPTIC LINK

CROSS-REFERENCE TO RELATED APPLICATION

This application is a continuation-in-part of co-pending U.S. application Ser. No. 13/913,480, entitled "Dispersionless multimode optical tap filter for high-speed data communications", filed on Jun. 9, 2013, which claims the benefits of U.S. Provisional Application No. 61/689,623, filed on Jun. 11, 2012.

BACKGROUND OF THE INVENTION

1. Field of the Invention

The invention is generally related to the area of optical communications. In particular, the invention is related to dispersionless multimode optical tap filters.

2. The Background of Related Art

To meet the ever-increasing demands for high bandwidth and more flexibility in modern communication networks, utilizing optical fiber networks capable of transmitting multiplexed channel signals is becoming increasingly popular. Many optical devices have been designed to meet the demands. Practically, these demands are arising from three areas: 1) video traffic over the Internet, such as Netflix and Youtube etc., 2) mobile access via smart phones including voice over IP (VoIP), 3) cloud storage and rich media files migrating via the Internet. All these demands seem to boost considerably the requirements on the service provider and the booming of various data centers. To meet the higher speed requirement, service providers and data centers also need more flexible network devices or equipment to support debugging and monitoring of the signals originated from them.

The availability of vertical cavity surface emitting laser (VCSEL) technology facilitates high speed parallel data links that can transmit 12 to 24 parallel channels, each channel supporting more than 10 gigabit/sec (Gbps). VCSEL has recently been demonstrated for bandwidth even higher than 25 Gbps and promises to provide low cost parallel data links among computers, storage devices and servers to form an aggregated data center. As networked computers and storage devices grow larger and larger in functions and complexities, monitoring the network becomes an essential task to ensure the communication quality and data integrity.

In the past, a data center used a conventional fuse coupler for tap monitoring function. An optical tap is essentially a 1×2 device, where a portion of the input signal is branched out to a photo-detector that converts the tapped signal to serve as a monitored signal. FIG. 1 shows one of the simplest optical links, a 1×2 coupler enables traffic access port (tap) to monitor the network.

By employing signals at two different wavelengths respectively, bi-directional signals can be conveniently carried on the duplex fibers as shown in FIG. 2 Two wavelengths $\lambda_1$ and $\lambda_2$ travel in the two opposite directions, respectively, and the 2×2 coupler allows tap monitoring for both channels.

A typical coupler splits the power of the input signal to different ports in a desired power ratio. It is originally a 3-port device where a portion of the input signal is branched out to a photo-detector that converts the tapped signal to a monitored signal. Depending on the applications, the power splitting ratio (tap-ratio) for the two wavelengths $\lambda_1$ and $\lambda_2$ should be either the same or different for the two wavelengths $\lambda_1$ and $\lambda_2$. For example, a bi-directional link may have $\lambda_1$=850 nm and $\lambda_2$=910 nm with same tap-ratio as 70% power on signal and 30% on tap, or different tap-ratios for the two channels as 7:3 for 850 nm but 8:2 for 910 nm.

FIG. 3 duplicates FIG. 2 of US Pat. Pub. No.: 2005/0201677 to show the structure of an exemplary multimode optical fiber coupler. Although the fiber can be either single mode or multimode for a fused coupler tap filter, the rapid growth of vertical cavity surface emitting laser (VCSEL) technology, which allows high speed parallel data links that can transmit 12 to 24 parallel channels, makes the multimode tap filter more important because the multimode oxide VCSEL offers modulation and reliability improvement comparing to that of single mode and has become the promising technology for high speed communication. However, the multimode fused optical coupler shows its fundamental limitation in high speed networks. As the data rate goes higher, the multimode fused optical coupler would have mode oriented insertion loss degradation, especially for coupler with non-symmetry tapping/splitting ratio. The degradation could be several dB in bit-error-rate (BER) testing. This is known as the modal dispersion due to the different group velocities for the higher and lower order modes propagating in multimode fiber. Since the dispersion also depends on the tap ratio, the outputs of express ports of a non-50/50 fused coupler have different dispersion. It limits the data bandwidth in a communication link especially in high speed (e.g., 10 Gbps and more).

The main cause for mode dispersion can be explained by the coupled-mode theory ("Simplified theory of the multi-mode fiber coupler", The Bell System Technical Journal, Vol. 56 No. 5, Page 729). In addition, the mode coupling in waveguide results in mode dependent loss. These effects are the fundamental limitation of fused optical coupler and therefore new design based on thin film filter was developed to fulfill the high speed application.

Fused fiber based coupler may have another difficulty in the 2×2 configuration for bi-directional link because the tap-ratio for each wavelength is not fully controllable independently. When the two wavelengths are relatively far away (e.g., about tens of nm), the wavelength dependent coupling results in uneven tap-ratios for the two channels. And it is extremely difficult to tune the tap-ratios for the two wavelength channels to the desire (7:3 and 8:2 for each, for instance) separately in fused coupler.

The present invention disclosure teaches a solution for monitoring optical power, dispersion and mode distribution in high speed multimode fiber communication. One embodiment of the present invention is a multimode optical tap filter that is dispersionless and tap ratio independent.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention is related to monitoring optical power, dispersion and mode distribution in high speed multimode fiber. According to one aspect of the present invention, a multimode optical tap filter is described. In one aspect of the present invention, an optical tap filter is a dispersionless optical tap filter in bi-directional multimode fiber optic link. The optical tap filter includes at least two parts optically engaged with a broadband thin film filter and taps out a monitoring signal from a communication signal according to a ratio set by the broadband thin film filter.

According to one embodiment, the present invention is an optical tap filter package comprising: a first part including a first dual fiber collimator including first and second ports; a second part including a second dual fiber collimator including first and second ports; and a broad thin film tap filter disposed between the first part and the second part, wherein a first light beam including a first wavelength is impinged upon the first port of the first part, the broad thin film tap filter transmits a portion of the first light beam at the first wavelength to the second port of the second part and reflects remaining of the first light beam to the second port of the first part, a second light beam including a second wavelength is impinged upon the first port of the second part, the broad thin film tap filter transmits a portion of the second light beam at the second wavelength to the first port of the first part and reflects remaining of the second light beam to the second port of the second part. Depending on an actual implementation, the broad thin film tap filter, the first part and the second part are optically aligned or via a reflector.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1 shows one of the simplest optical links, a 1×2 coupler enables traffic access port (tap) to monitor the network;

FIG. 2 shows that bi-directional signals can be conveniently carried on the duplex fibers by employing signals at two different wavelengths respectively;

FIG. 7A shows that an alternative design to achieve the same function of the coupler of FIG. 5A is to use both C-lens for the dual-fiber collimators instead of one C-lens and one GINE-lens in FIG. 5A;

FIG. 7B shows a design using two GINE-lens based collimators as a sub-optimal approach;

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 4-10. However, those skilled in the art will readily appreciate that the detailed description given herein with respect to these figures is for explanatory purposes as the invention extends beyond these limited embodiments.

To provide a solution for high speed multimode fiber monitoring of optical power, dispersion and mode distribution, a thin film filter based or TFF-based coupler and a method of making the same are described. As tapping occurs at the coated thin film interface immediately without the transportation coupling or mode order dependent coupling coefficient issues, the high order modes and low order modes are perfect converged by a lens system. This thin film tap is not mode sensitive and has no dispersion issue, thus it is also suitable for high speed (8 Gbps and above) applications. Further, the tap-ratio of this device is purely controlled by the coating of the TFF and can be tuned relatively easily by adjusting the coating layers. For a 2×2 configuration, the tap ratio for two different wavelength channels can be the same when using a broadband flat response filter, and can also be different for two relatively far wavelengths as the coating layers can be specially designed.

Figure 3:
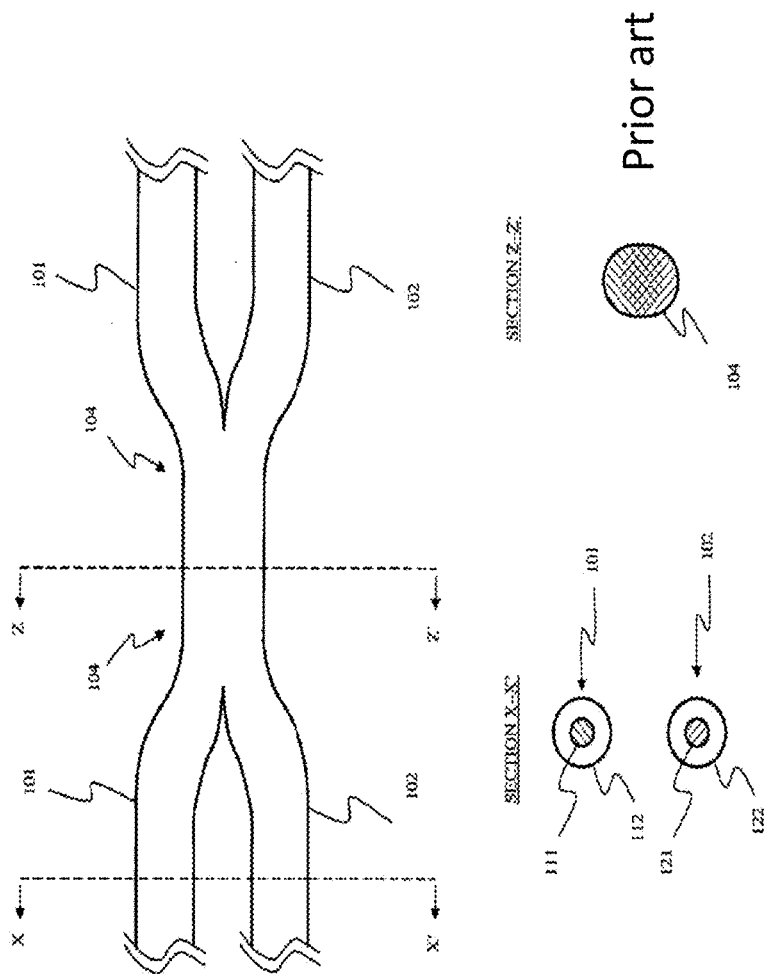
FIG. 3 duplicates FIG. 2 of US Pat. Pub. No.: 2005/0201677 to show the structure of an exemplary multimode optical fiber coupler.
Figure 4:
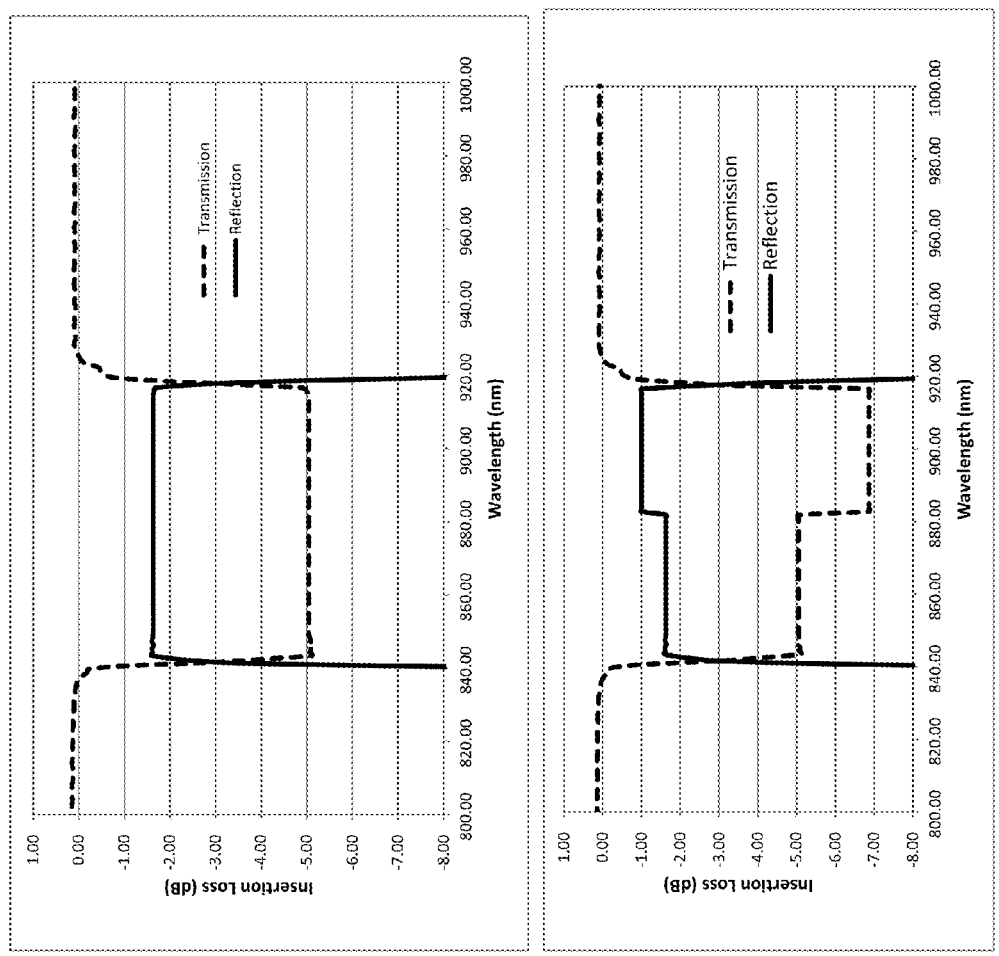
FIG. 4 shows a pair of filter responses for typical TFF with flat response (top) and varies responses (bottom) for the wavelengths at 850 nm and 910 nm.

Referring now to the drawings, in which like numerals refer to like parts throughout the several views. FIG. 4 shows a pair of filter responses for typical TFF with flat response (top) and varies responses (bottom) for the wavelengths at 850 nm and 910 nm. it shall be noted that each of the wavelengths itself can be used for the forward or backward channel respectively since the channels have their roles equivalent in the optical link.

Besides the 850 nm and 910 nm, one embodiment of the present invention can be implemented to other telecommunication bands, such as 850/1310 nm, 1310/1550 nm, 1550/1625 nm, 780/1064 nm, and 780/1550 nm. In principle, any wavelengths pairs in optical link can use this technique, and the tap ratios can vary for each wavelength based on a desire.

In addition, the two channels can both use the same wavelength so only one wavelength is in the link.

According to one embodiment of the present invention, the TFF-based fiber coupler disclosed herein provides a solution for high speed bi-directinal optical link with signal monitoring without the issue of both mode dispersion and tap-ratio control because of the use of dispersionless and tap ratio independent TFF to comply with the high speed networks. Depending on implementation, there can be two different structures, 2×2 and 1×4 forms, respectively.

A. 2×2 Form (Type A)

Figure 5A:
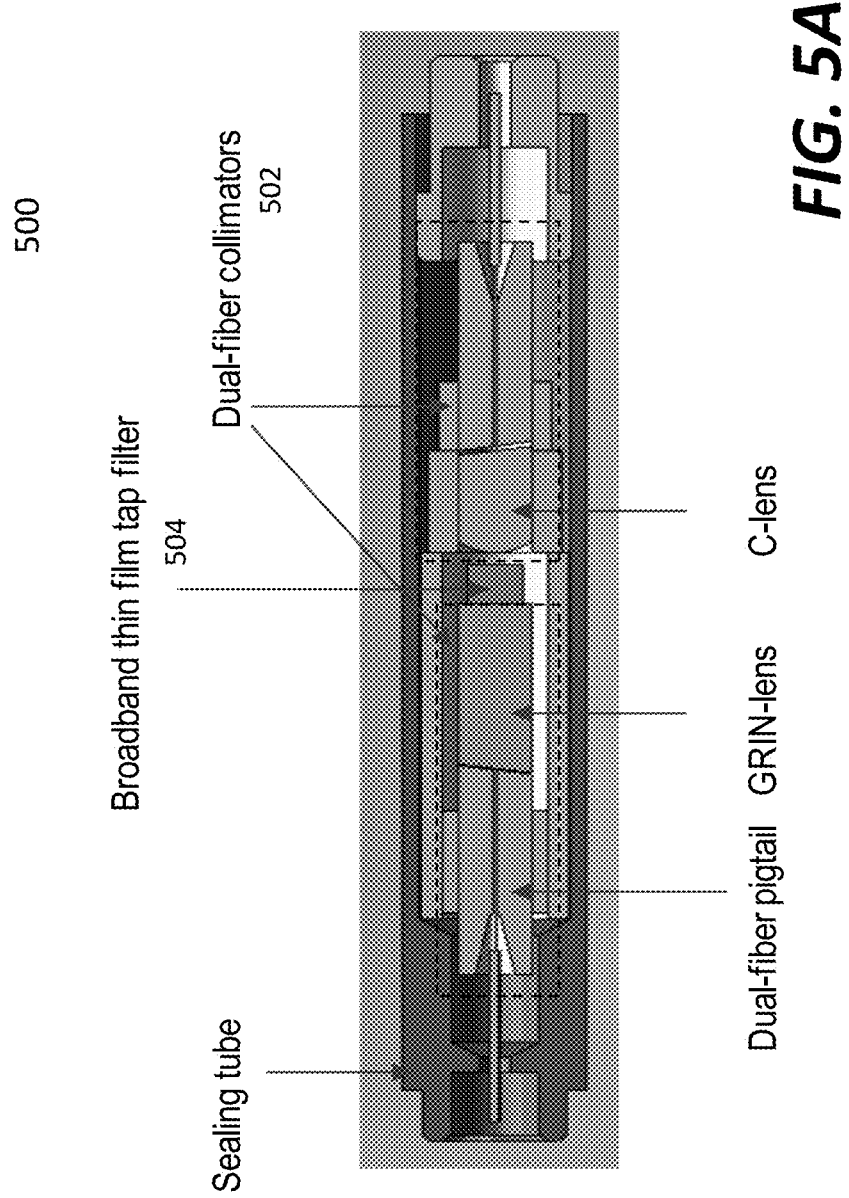
FIG. 5A shows a configuration of a 2×2 coupler layout by using two dual fiber collimators and a broadband power splitting TFF.
Figure 5B:
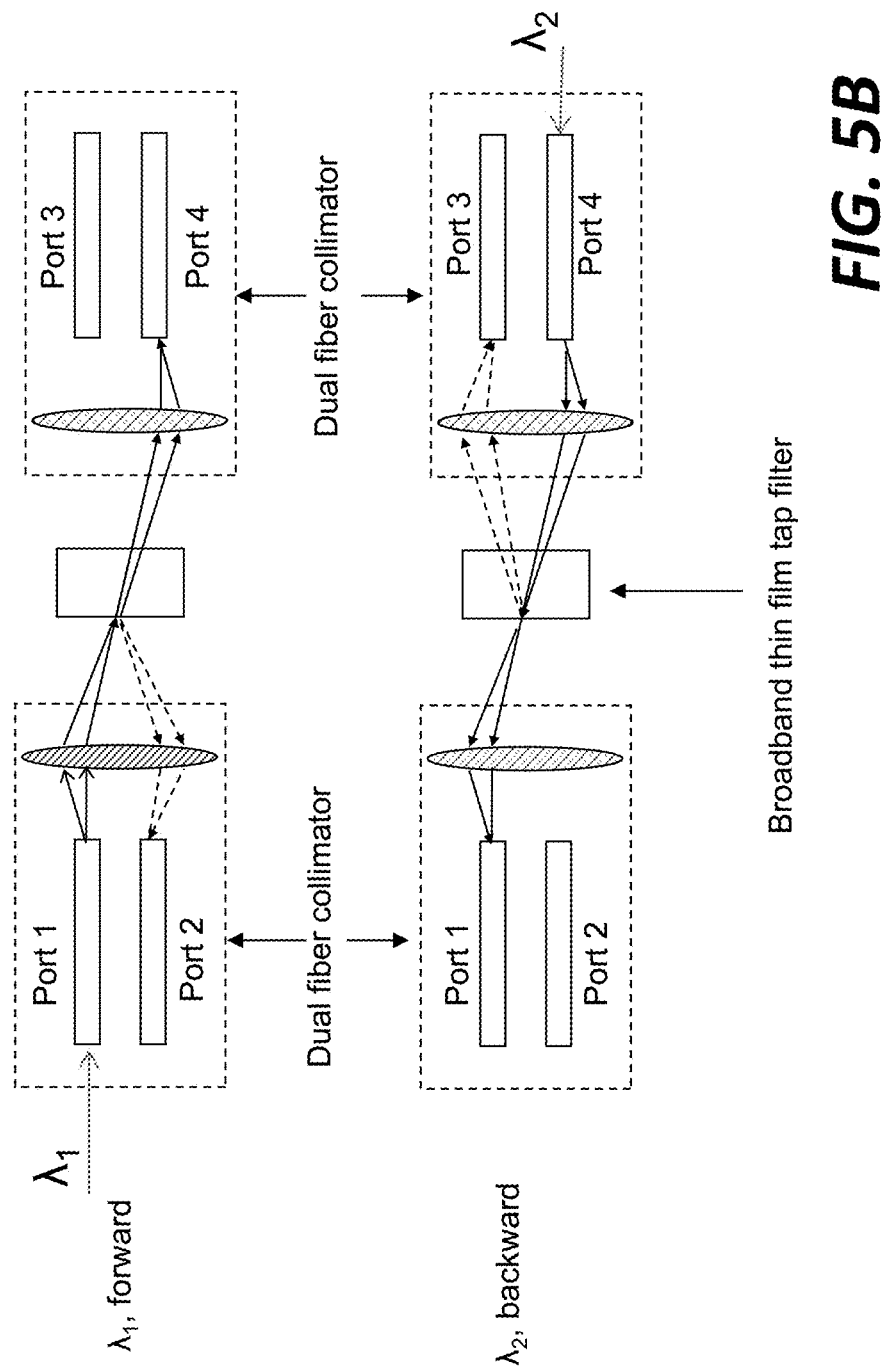
FIG. 5B shows corresponding optical paths.

FIG. 5A shows a configuration 500 of a 2×2 coupler layout by using two dual fiber collimators 502 and a broadband power splitting TFF 504. The tap filter 504 functions as a beam splitter mirror that reflects and transmits the optical power in a desired ratio. The thin film filter 504 has its pass band covering the wavelengths $\lambda_1$ and $\lambda_2$ for bi-directional application. FIG. 5B shows corresponding optical paths. For wavelength $\lambda_1$, the light beam is coupled in at Port 1 and has reflection at port 2 and transmission at port 4, respectively as the arrows indicated. For a signal of wavelength $\lambda_2$ traveling to the opposite direction, the light beam is coupled to the port 4, the transmission goes to port 1 and the reflection goes port 3, respectively. The thin film filter has a constant beam splitting ratio for the whole pass band covering $\lambda_1$ and $\lambda_2$, so the power splitting ratio for reflection/transmission beam is the same for both wavelengths.

Figure 6:
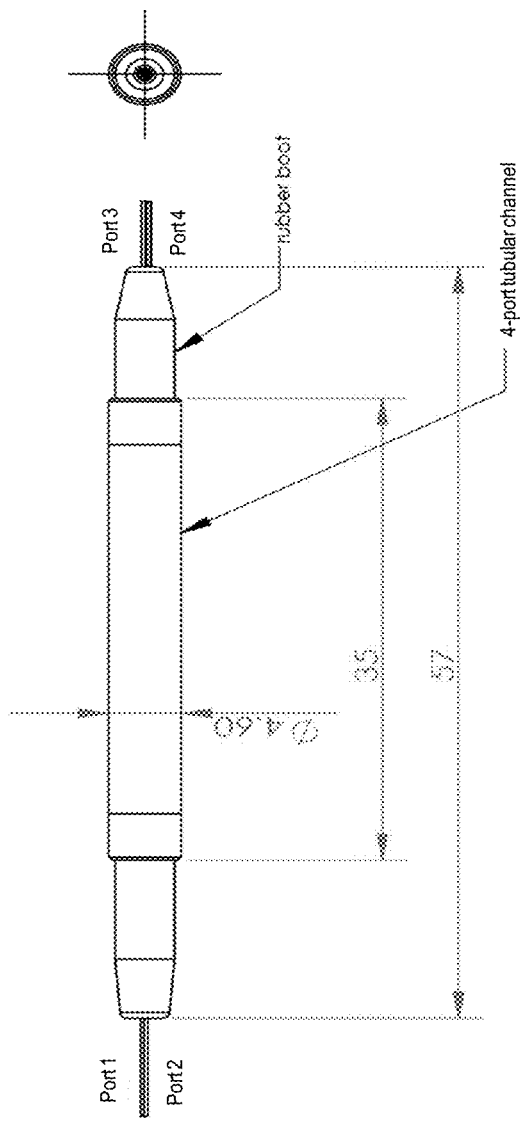
FIG. 6 shows an exemplary package of the device in a compact channel form.

In one embodiment, the splitting ratio can be easily tuned within a wide range from 1-99% by coating with appropriate thin film. The dual-fiber collimators 502 have two multimode fibers parallel assembled to serve as ports 1 and 2 as well as ports 3 and 4. FIG. 6 shows an exemplary package of the device 500 in a compact channel form.

Referring now to FIG. 7A, it shows an alternative design 700 to achieve the same function of the coupler of FIG. 5A is to use both C-lens for the dual-fiber collimators instead of one C-lens and one GINE-lens in FIG. 5A. An extra sleeve tube 702 is used to hold the TFF 704 in place. The optical function in this design is substantially similar to that of FIG. 5A. FIG. 7B shows a design 710 using two GINE-lens based collimators as a sub-optimal approach. Since channel 1 and 2 are equivalent in the network, C-lens, GRIN-lens or even any other kinds of lens such as Fresnel Lens as one or more of the collimators may be used without affecting the optical function.

B. 1×4 Form (Type B)

Figure 8A:
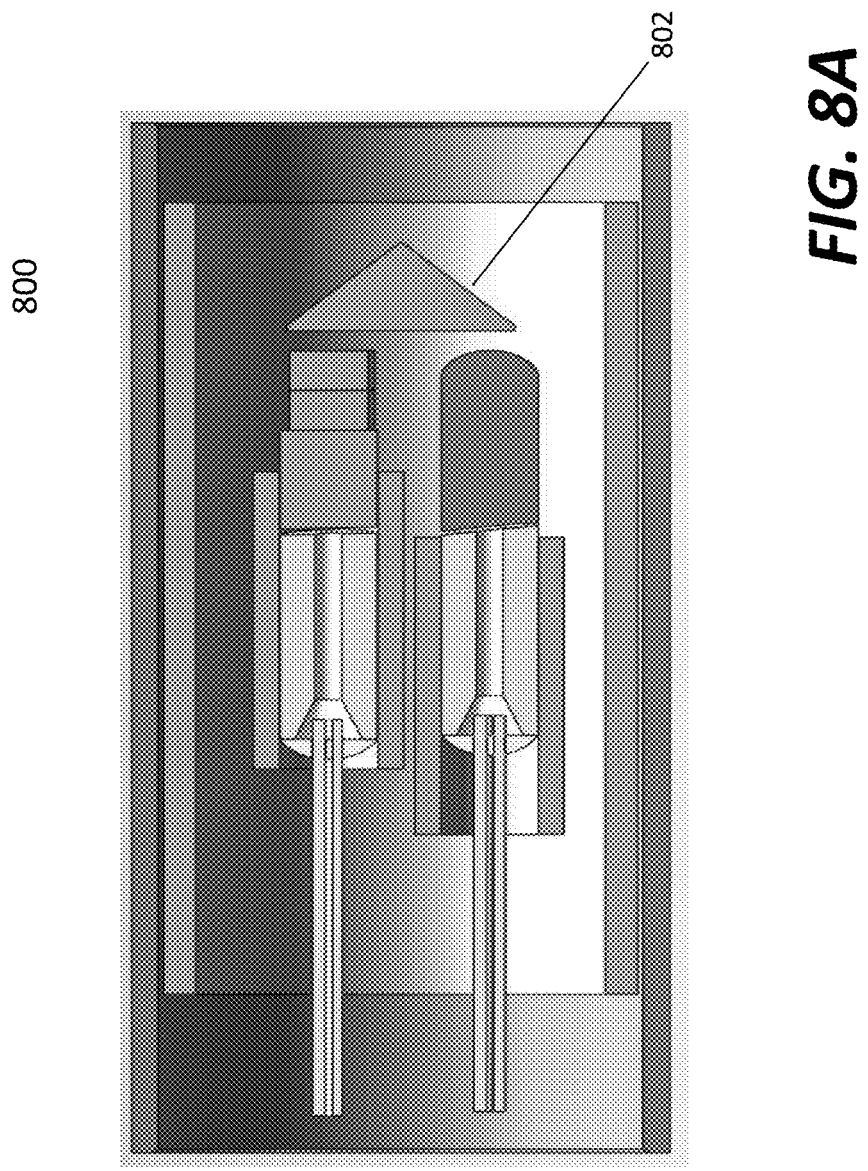
FIG. 8A shows an exemplary 1×4 configuration that has the same optical function as the 2×2 configuration shown in FIG. 5A, 6 or 7A.
Figure 8B:
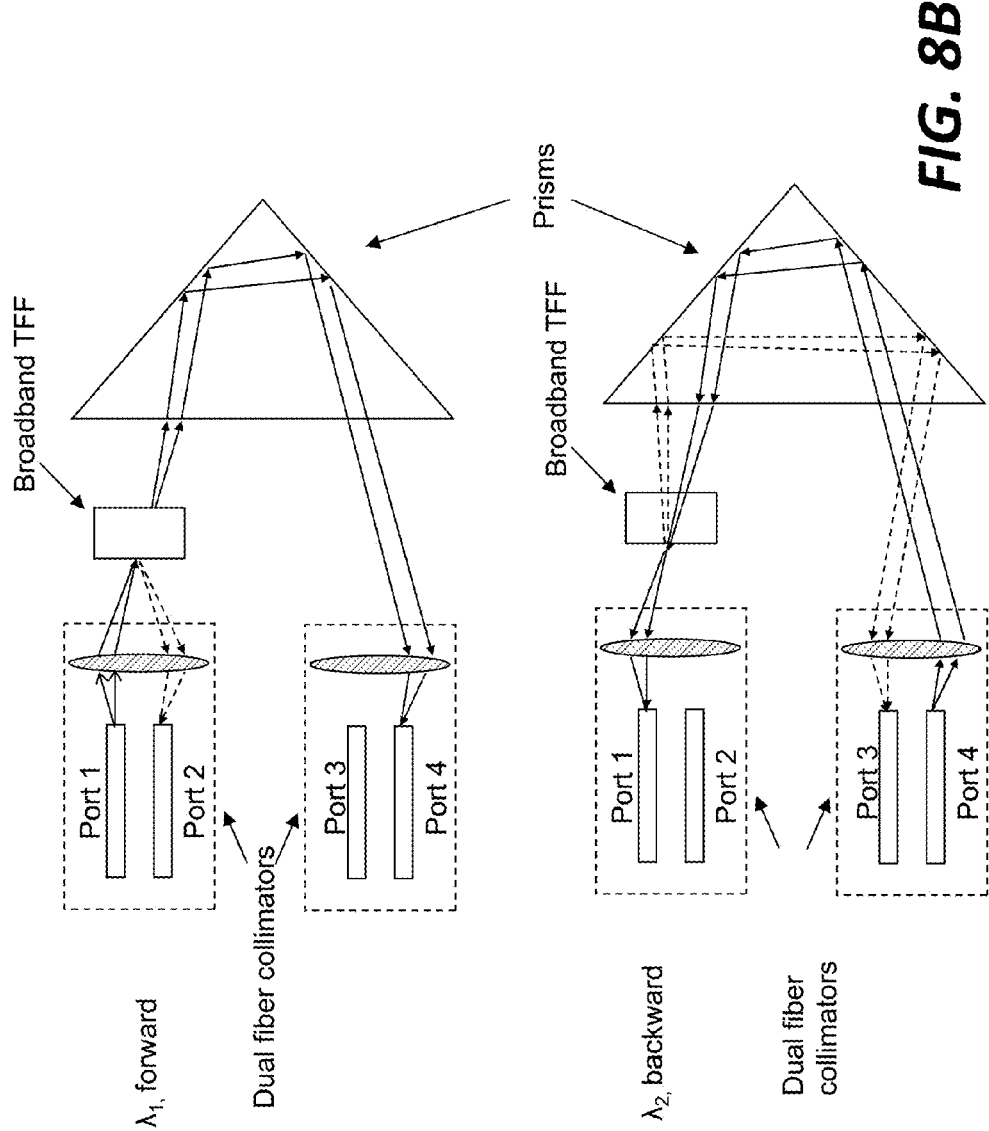
FIG. 8B shows corresponding optical paths of FIG. 8A, where the prism can be easily replaced by other types of retro-reflectors, such as two mirrors or other types of prisms.

The same optical function can be achieved in a 1×4 structure, where the fibers are all arranged on one side of the device or structure (instead of on both sides). This fiber arrangement allows the device to meet the layout for certain systems/subsystems. FIG. 8A shows an exemplary 1×4 configuration 800 that has the same optical function as the 2×2 configuration shown in FIG. 5A, 6 or 7A. A total internal reflection (TIR) prism 802 is used as shown in FIG. 8A. FIG. 8B shows the corresponding optical paths. The prism 802 in FIG. 8B can be easily replaced by other types of retro-reflectors, such as two mirrors or other types of prisms.

Figure 9:
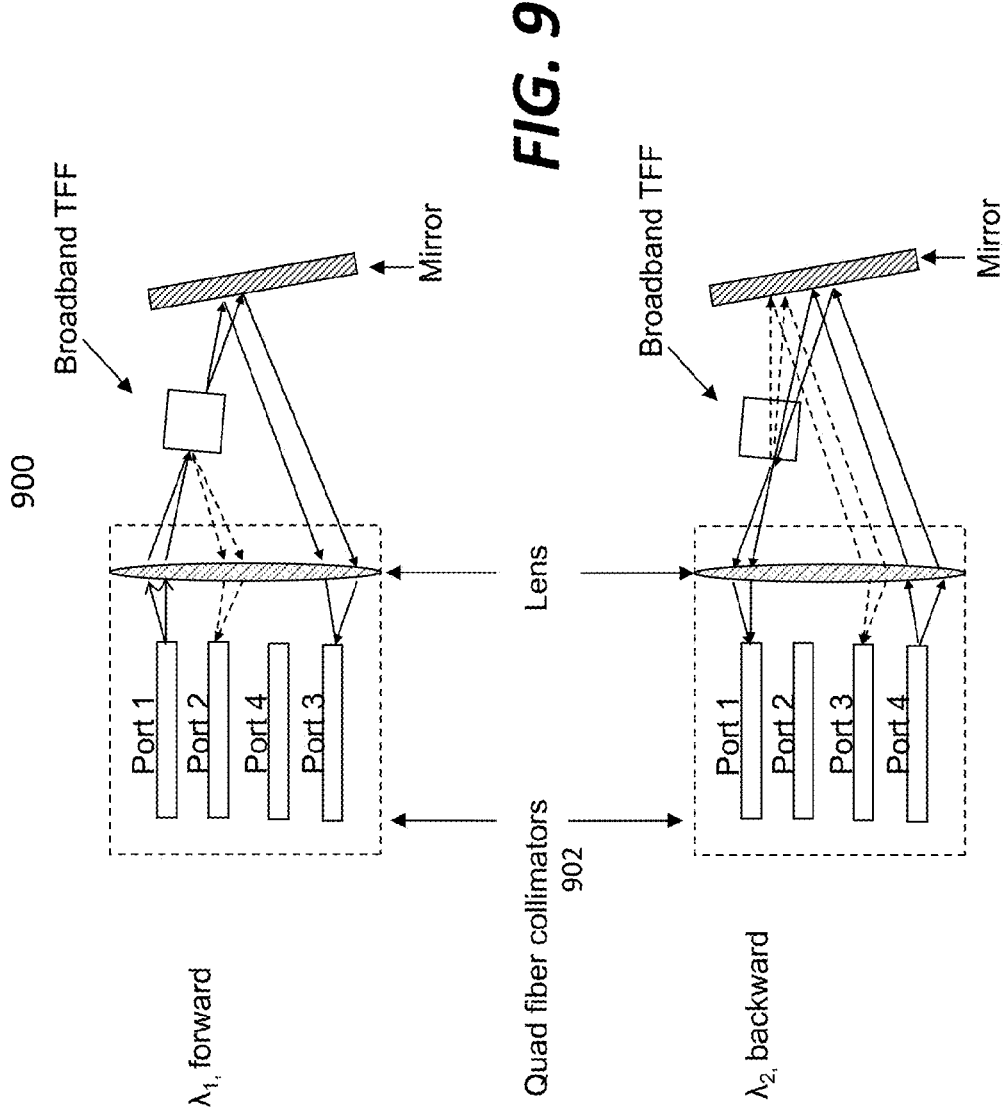
FIG. 9 shows that the two dual fiber collimators used in FIG. 8A can be replaced by a single quad fiber collimator.

FIG. 9 shows that the two dual fiber collimators used in FIG. 8A can be replaced by a single quad fiber collimator 902. All the 4 fibers share the same lens and the dimension, hence the cost can be reduced.

Figure 10:
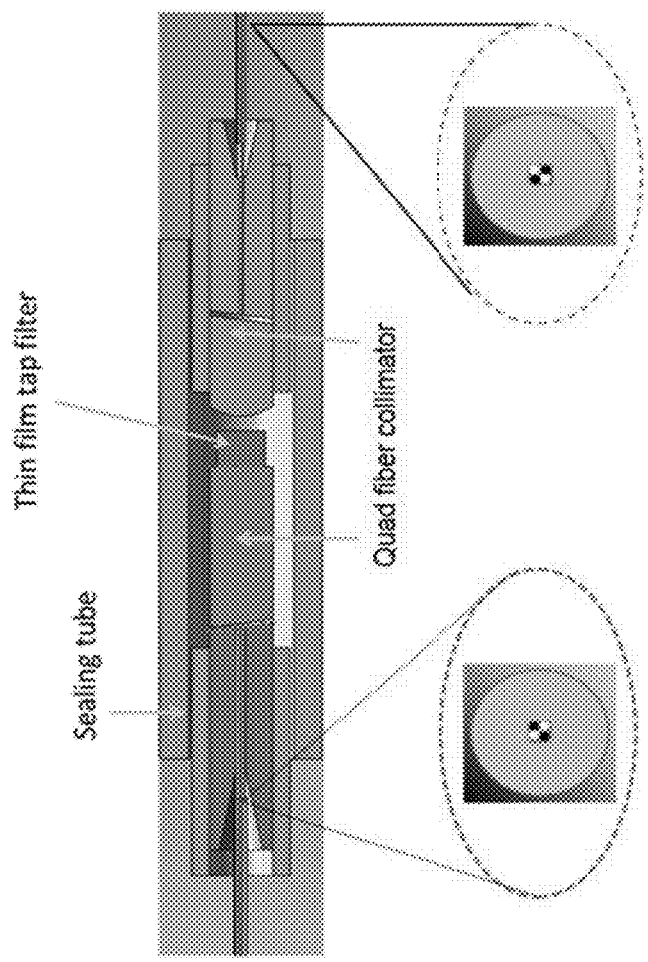
FIG. 10 shows an exemplary 2×2 TFF coupler for high speed application.

According to another embodiment, the design of 4-port tap can be extended into an 8-port tap containing 2 parallel sets of devices. The channels number is doubled but the dimension of the package and manufacture cost are not affected. FIG. 10 shows an exemplary 2×2 TFF coupler for high speed application. The black and white circles indicate 2 different sets of the fibers that function independently. One of the key modifications in this embodiment is to use quad fiber collimators on both sides instead of dual fiber collimators. It is equivalent to combine 2 pieces of 2×2 tap couplers in a single package, 2-in-1 design, and therefore it contains 2 pairs of channels.

As shown in FIG. 10, the black and white colors in the cross section indicate the 2 sets of fibers. The black and white fiber sets function as two 2×2 couplers which work independently but sharing the same TFF and converging lenses. The crosstalk between the black and white fibers is minimized by the path of light. In addition, the two wavelengths signals supported by each set can be the same (both $\lambda 1$ and $\lambda 2$) or different ($\lambda 1$ and $\lambda 2$, $\lambda 3$ and $\lambda 4$). This 2-in-1 package will benefit high density routing which optical communication always requires, since the occupied volume of 2-in-1 is half of standard single channel. The 2-in-1 package can also reduce the cost of tapping for high speed because the thin film coating and lens etc. are shared in the same package.

Besides multimode fibers, single mode fibers can also be used in the present invention. The optical functions and performance will not be decreased. This invention is also capable for various types of optical fibers, such as bending insensitive fiber (BIF) or polarization maintaining (PM) fiber, to fulfill different applications in the networks. Comparing to the fused fiber coupler, change of the fiber is easy and has minimum impact on the optical performance and manufacturing process due to the fiber independent tap ratio.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

What we claim is:

1. An optical tap filter package comprising:
   a first part including a first dual fiber collimator having first and second ports;
   a second part including a second dual fiber collimator having first and second ports; and
   a broad thin film tap filter disposed between the first part and the second part, wherein a first light beam including a first wavelength is impinged upon the first port of the first part, the broad thin film tap filter transmits a portion of the first light beam at the first wavelength to the second port of the second part and reflects remaining of the first light beam to the second port of the first part, a second light beam including a second wavelength is impinged upon the first port of the second part, the broad thin film tap filter transmits a portion of the second light beam at the second wavelength to the first port of the first part and reflects remaining of the second light beam to the second port of the second part.

2. The optical tap filter package as recited in claim 1, wherein the broad thin film tap filter, the first part and the second part are optically aligned.

3. The optical tap filter package as recited in claim 2, wherein the broad thin film tap filter and the first part are coaxially aligned, and optically aligned with the second part via a reflector.

4. The optical tap filter package as recited in claim 3, wherein the reflector is a prism.

5. The optical tap filter package as recited in claim 3, wherein the reflector is a mirror.

6. The optical tap filter package as recited in claim 2, wherein the broad thin film tap filter, the first part and the second part are sealed in a tube.

7. The optical tap filter package as recited in claim 1, wherein the broad thin film tap filter is designed maintain a desired ratio of an transmitted signal over a reflected signal.

8. The optical tap filter package as recited in claim 7, wherein the ratio of is greater than 50%.

9. The optical tap filter package as recited in claim 1, wherein each of the first and second parts comprises a dual fiber collimator and a lens.

10. The optical tap filter package as recited in claim 9, wherein the lens is one of C lens and GRIN lens.

11. The optical tap filter package as recited in claim 9, wherein the dual fiber collimator uses a single-mode fiber and a multimode fiber.

12. The optical tap filter package as recited in claim 1, wherein each of the first and second parts comprises a quad fiber collimator with four ports and a lens.

13. The optical tap filter package as recited in claim 12, wherein two pairs of the ports work independently.

14. The optical tap filter package as recited in claim 1, wherein the optical tap filter package is structured as 2×2 or 1×4 form.

15. The optical tap filter package as recited in claim 14, wherein the optical tap filter package is used in high speed networks.

* * * * *